United States Patent [19]

Tsushima et al.

[11] Patent Number: 5,305,134
[45] Date of Patent: Apr. 19, 1994

[54] OPTICAL FREQUENCY DIVISION MULTIPLEXING TRANSMITTER AND OPTICAL FREQUENCY DIVISION MULTIPLEXING TRANSMISSION APPARATUS

[75] Inventors: Hideaki Tsushima, Hachioji; Shinya Sasaki, Kodaira; Shigeki Kitajima, Kokubunji; Kiichi Yamashita, Kanagawa, all of Japan

[73] Assignee: Hitachi, Ltd., Tokyo, Japan

[21] Appl. No.: 574,086

[22] Filed: Aug. 29, 1990

[30] Foreign Application Priority Data

Aug. 30, 1989 [JP] Japan .................... 1-221437

[51] Int. Cl.$^5$ .............. H04B 14/02; H04B 10/06
[52] U.S. Cl. .................... 359/192; 359/133; 359/124
[58] Field of Search ............ 359/124–125, 359/127, 133, 134, 191, 192; 455/196.1, 203, 59, 61

[56] References Cited

U.S. PATENT DOCUMENTS

| | | | |
|---|---|---|---|
| 3,953,727 | 4/1976 | d'Auria | 359/127 |
| 4,474,424 | 10/1984 | Wagner | 359/127 |
| 4,831,663 | 5/1989 | Smith | 359/192 |
| 4,841,519 | 6/1989 | Nishio | 359/133 |
| 4,861,136 | 8/1989 | Stone | 359/127 |
| 4,933,929 | 6/1990 | Tajima | 359/133 |
| 4,942,568 | 7/1990 | Khoe | 359/133 |
| 4,945,531 | 7/1990 | Suzuki | 359/133 |

FOREIGN PATENT DOCUMENTS 62-43231  2/1987  Japan .................... 359/191

OTHER PUBLICATIONS

Tsushima et al., "Novel Optical FSK Modulation/-Demodulation Schemes with AMI encoding", The Transactions of the IEICE, vol. 71 #11, Nov. 1988.

Primary Examiner—Leslie Pascal
Attorney, Agent, or Firm—Antonelli, Terry, Stout & Kraus

[57] ABSTRACT

An optical frequency division multiplexing transmitter is disclosed, which comprises a plurality of optical transmitters having different optical frequencies; an optical combiner multiplexing optical signals outputted by the different optical transmitters; and an optical filter having passbands, the frequency of each of which is approximately in accordance with the frequency of each of the signals, in which the signal thus multiplexed is inputted.

7 Claims, 9 Drawing Sheets

OPTICAL FREQUENCY DIVISION MULTIPLEXING TRANSMITTER AND OPTICAL FREQUENCY DIVISION MULTIPLEXING TRANSMISSION APPARATUS

BACKGROUND OF THE INVENTION

The present invention relates to an optical transmitter outputting optical-frequency division-multiplexed (optical FDM) signals and an optical transmission apparatus transmitting optical FDM signals and in particular to an optical transmitter and an optical transmission apparatus suitable for realizing communication of large capacity through one optical fiber by narrowing the frequency spacing (channel spacing) between different signals constituting the optical-frequency-division-multiplexed signals.

In an optical FDM transmission system, by which a plurality of signals are transmitted through one optical fiber by the optical frequency division multiplexing, the channel spacing is an important parameter determining the transmission capacity. Heretofore it is thought that this channel spacing is limited by crosstalk from adjacent signals (adjacent channels). For example, in a literature "Institute of Electronics, Information and Communication Engineers, Technical Report, Optical Communication System Study Group OCS 89-31, Jun. 23, 1989" (in Japanese) (hereinbelow called simply "Literature 1"), the channel spacing is studied in detail both experimentally and theoretically.

Figure 2A:
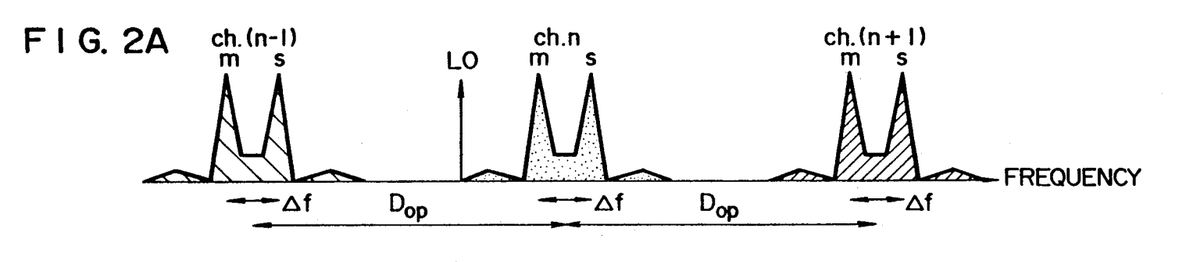
FIGS. 2A to 2D are schemes showing the spectrum of the signal and the process of reception in a prior art apparatus.
Figures 2B, 2C:
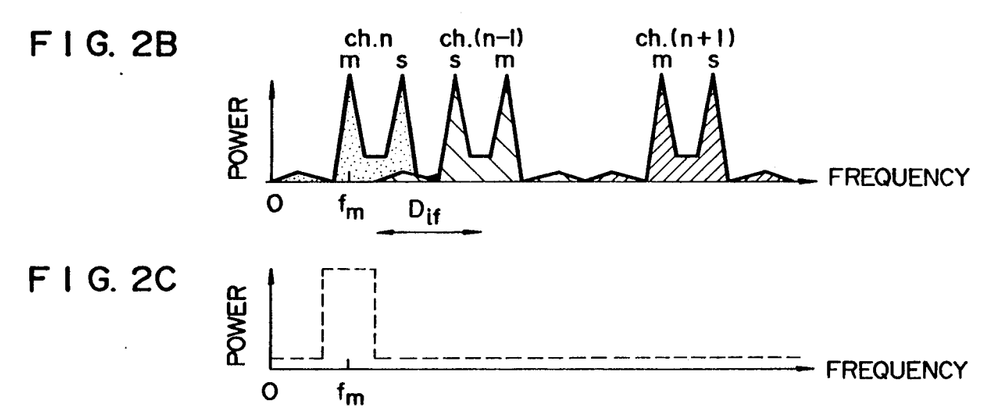
Figure 2D:
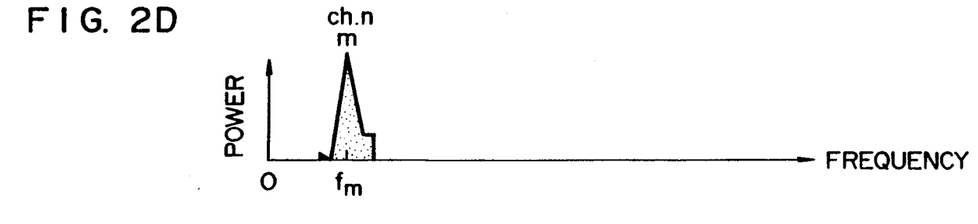

The crosstalk from adjacent channels is, e.g. in the case where the heterodyne detection is used, a phenomenon that a part of the spectrum of an adjacent channel converted into an intermediate frequency (IF) signal as an image enters in the passband of an IF filter for extracting a signal to be received (received channel), which gives rise to a problem, because the enters component acts as if it were noise. FIGS. 2A to 2D show an example of the allocation of the spectrum of an optical-frequency-division-multiplexed signal in an optical frequency division multiplexing system (refer to Literature 1), in which the frequency shift keying (FSK) modulation is used for the modulation scheme and a single filter and envelope detector are used for the demodulation scheme. FIG. 2A indicates allocation of spectrums of respective channel (respective ch.) on the abscissa on the axis of the optical frequency. The number of multiplexed signals (total number of channels) is N. Mark n denotes the channel number and fulfils $1 < n \leq N$. $D_{op}$ represents the channel spacing and $\Delta f$ the frequency deviation. Further m and s represent the mark and the space component of the signal, respectively. LO indicates the power from the local oscillator light source. FIG. 2B indicates the spectrum of the signal obtained by heterodyne-detecting this optical-frequency-division-multiplexed signal. As the result of the heterodyne detection, the channels are allocated on the IF frequency axis in the order of n, (n−1), (n+1), ....., from the low frequency side. The IF filter (the transmission characteristics thereof being represented by a dot-dashed line) is so set that only the mark component (central frequency: $f_m$) of the received channel (channel n ch.) is extracted, as indicated in FIG. 2C. FIG. 2D shows the output signal from the IF filter. The value of the channel spacing $D_{if}$ from the adjacent channel on the IF frequency axis is determined by the crosstalk from the adjacent channel (n−1). The channel spacing $D_{if}$ is discussed in detail in Literature 1. At this time the channel spacing $D_{op}$ on the optical frequency axis is given by the following equation;

$$D_{op} = D_{if} + 2 \cdot f_m + \Delta f \quad (1)$$

Heretofore it was not possible to decrease the channel spacing on the optical frequency axis to a value below the frequency spacing given by Eq (1).

SUMMARY OF THE INVENTION

The object of the present invention is to provide an optical frequency division multiplexing transmitter and an optical frequency division multiplexing transmission apparatus, by which the optical frequency division multiplexing can be realized with a channel spacing narrower than that used by the prior art techniques.

The optical frequency division multiplexing transmitter for achieving the above object can be realized by disposing an optical filter having such a passband that extracts only the minimum spectrum required for the signal demodulation for each of the signals constituting the optical-frequency division-multiplexed signal in the transmitter.

The optical frequency division multiplexing transmission apparatus for achieving the above object can be realized by disposing an optical filter as described above in the transmission apparatus.

Figure 3A:
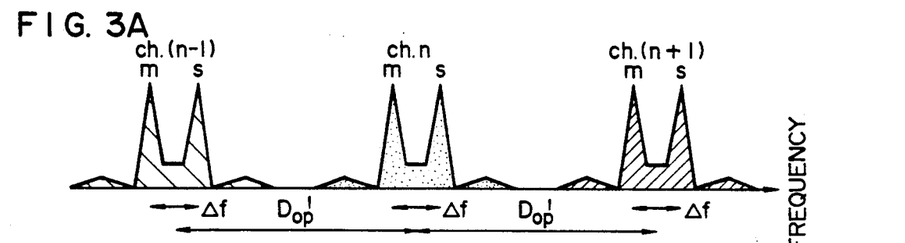
FIGS. 3A to 3F are schemes showing the spectrum of the signal, the transmission characteristics of an optical filter and the process of reception in the first embodiment.
Figure 3B:
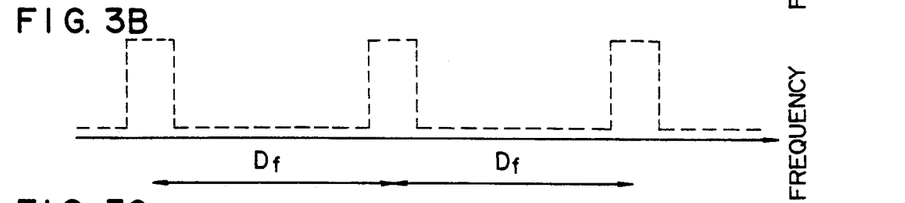
Figure 3C:
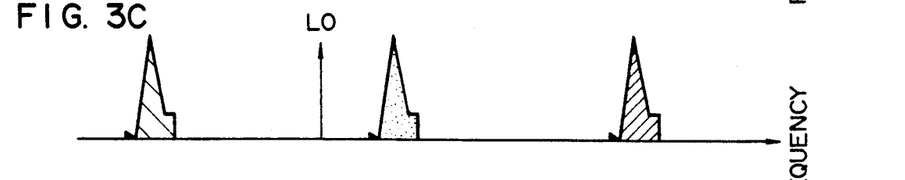
Figure 3D:
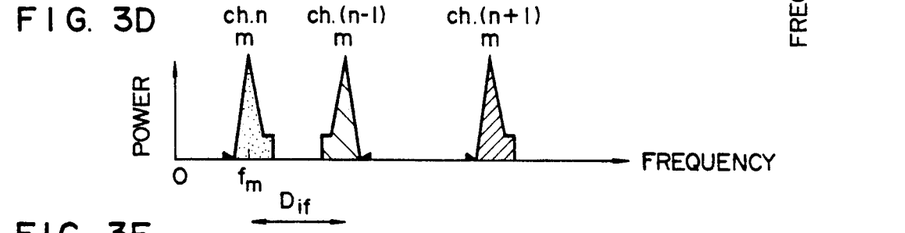
Figure 3E:
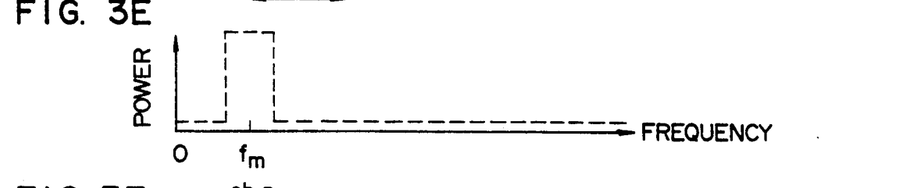
Figure 3F:
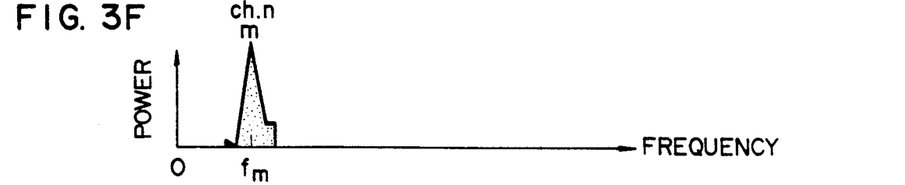

By using the means described above it is possible to eliminate the part of the spectrum of the adjacent channel enters in the band of the IF filter in the stage before the heterodyne detection by means of the optical filter now a case is considered, in which in an optical filter having the transmission characteristics as indicated e.g. by a broken line in FIG. 3B, the bandwidth of the passband being represented by $B_f (\approx 2 \times$ bit rate of signal), the frequency spacing between the relevant passband and the adjacent passband by $D_f (= D_{op})$, the central frequency of the passband is in accordance with the central frequency of the mark component of each of the signals. When the optical frequency-division multiplexed signal indicated in FIG. 3A is inputted in the optical filter described above, only the mark component is extracted and a signal as indicated in FIG. 3C is outputted. The spectrum obtained by heterodyne-detecting the optical-frequency-division-multiplexed signal outputted by the optical filter is indicated in FIG. 3D. Similarly to the case indicated in FIG. 2B, the central frequency of the mark component of the received channel n is set at $f_m$. When an IF filter (FIG. 3E) similar to the case indicated in FIG. 2C is used, it is possible to extract only the mark component of the received channel n (refer to FIG. 3F). At this time the channel spacing between the received channel n and the adjacent channel (n−1) is given by $D_{if}$, similarly to the case where no optical filter is used (refer to FIG. 2B). However, since each of the channels has a narrow band spectrum consisting of only the mark component, the channel spacing $D'_{op}$ on the optical frequency axis is narrower than that obtained in the case indicated in FIG. 2A and given by the following equation;

$$D'_{op} = D_{if} + 2 \cdot f_m \quad (2)$$

As clearly seen from Eq. (2), according to the present invention, the channel spacing on the optical frequency axis can be narrower than that obtained by the prior art techniques (Eq. (1)). That is since an optical frequency division multiplexing transmitter capable of optical frequency division multiplexing signals with a channel spacing narrower than that used by the prior art techniques can be realized as well as an optical frequency division multiplexing transmission apparatus capable of transmitting signals optical-frequency-division-multiplexed with a channel spacing narrower than that used by the prior art techniques can be realized, an effect is obtained that an optical communication system of larger capacity than the prior art techniques can be realized.

DESCRIPTION OF THE PREFERRED EMBODIMENTS

Figure 1:
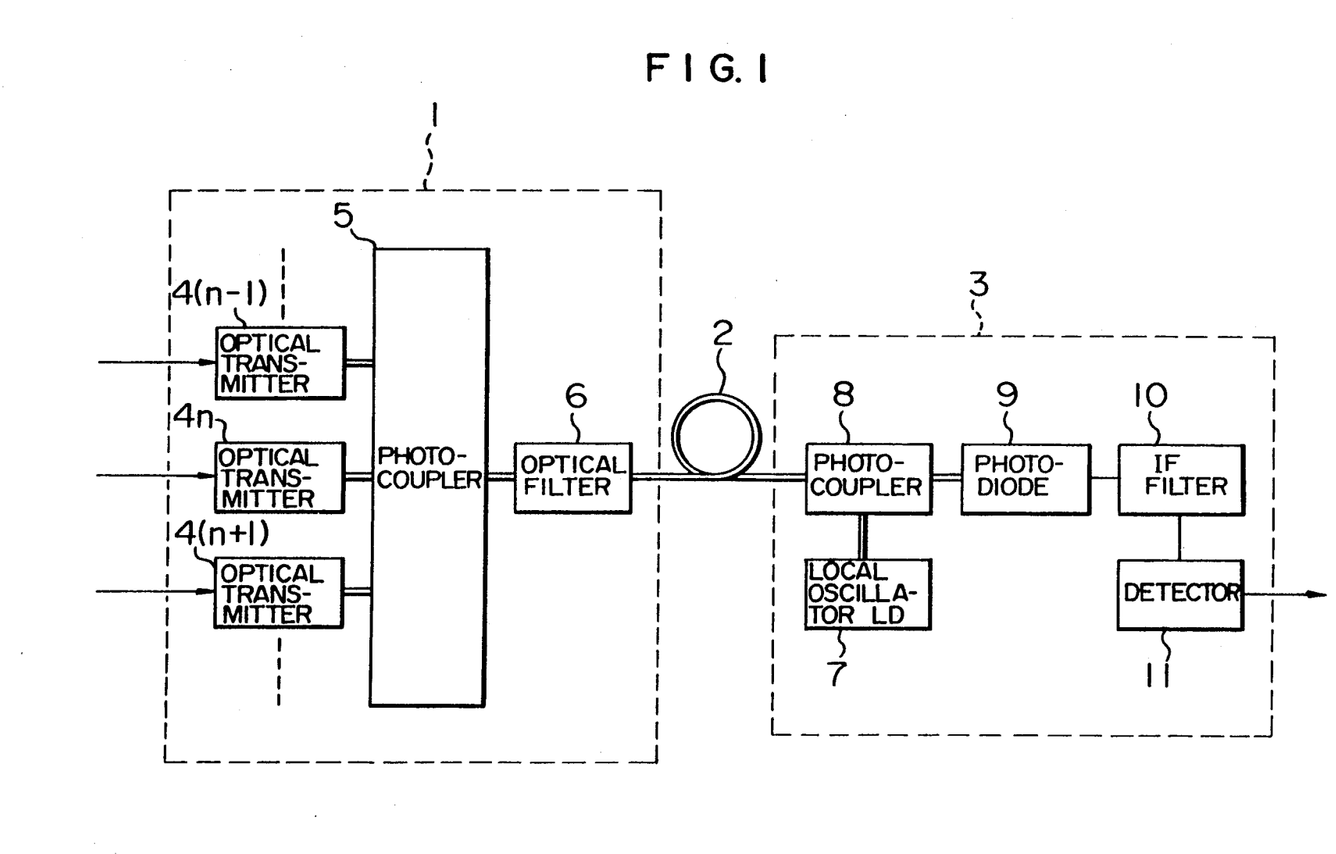
FIG. 1 is a scheme showing a first embodiment of the optical frequency division multiplexing transmitter and the optical frequency division multiplexing transmission apparatus according to the present invention.

FIG. 1 shows the first embodiment of the optical frequency division multiplexing transmitter and the optical frequency division multiplexing transmission apparatus according to the present invention. In the figure, an optical frequency division multiplexing transmitter 1 is connected with a heterodyne optical receiver 3 through an optical fiber 2 serving as a transmission path. A plurality of electric signals (total number of channels being N) are inputted in the optical frequency division multiplexing transmitter, and directly modulate optical transmitters ... $4(n-1)$, $4n$, $4(n+1)$ ..., respectively, where n represents the channel number and fulfils $1 < n \leq N$. The transmitter light sources can be realized by using distributed feedback type semiconductor lasers (DFB-LD), distributed Bragg reflection type semiconductor lasers (DBR-LD), etc. An optical coupler 5 outputs multiplexed FSK optical signals having large frequency deviations outputted by the different transmitter light sources 4. An optical filter 6 connected with the optical coupler 5 can be realized by using e.g. a Fabry-Perot resonator. The Fabry-Perot resonator is described in detail e.g. in IEEE, Journal of Lightwave Technology, Vol. 6, No. 9, September 1988, pp. 1406–1414. The frequency spacing $D_f$ between the relevant passband and the adjacent passband is called usually free spectral range: FSR and can be designed by using a relationship represented by the following equation;

$$D_f = c/2nL \qquad (3)$$

where c, n and L represent the light velocity in vacuum, the refractive index of the resonator and the length of the resonator respectively. The bandwidth $B_f$ is common to the different passbands and it is known that it can be expressed by the following equation;

$$B_f \approx D_f(1 - R)/\pi \sqrt{R} \qquad (4)$$

where R represents the reflection coefficient of the end facet of the resonator. From the above description it can be understood that it is possible to realize an optical filter satisfying $D_f \approx D_{op}$ and $B_f \approx (2 \times \text{bit rate of signal})$, i.e. an optical filter having the transmission characteristics as indicated by FIG. 3B. As the result, since the optical frequency-division-multiplexed signal outputted by the optical filter has a narrow band spectrum consisting of only the mark components for the different channels, it is possible to make the channel spacing on the optical frequency axis narrower than that used by the prior art techniques. The optical-frequency-division-multiplexed signal outputted by the optical frequency division multiplexing transmitter 1 is inputted in the usual heterodyne optical receiver 3 after having been propagated through the optical fiber 2 to be converted into a spectrum having an allocation indicated in FIG. 3D. In this way only the received channel is demodulated. The heterodyne optical receiver 3 is composed of at least a local oscillator light source 7, an optical coupler 8, a photodiode 9, an IF filter 10 and an envelope detector 11 serving as a modulating circuit. The local oscillator light source 7 can be realized by a DFB-LD or a DBR-LD, similarly to the optical transmitter.

According to the present embodiment, since an optical frequency division multiplexing transmitter capable of optical-frequency-division-multiplexing signals with a channel spacing narrower than that used heretofore and an optical frequency division multiplexing transmission apparatus capable of transmitting the opticalfrequency-division multiplexed signal can be realized with a simple construction, an effect is obtained that an optical communication system having a capacity larger than that obtained by the prior art techniques can be realized at a low cost.

Further, although, in the present embodiment, FSK is used for the modulation scheme; the direct modulation by means of a semiconductor laser is used for the modulation method; the heterodyne detection, the single filter and envelope detection are used for the demodulation scheme; and the optical-frequency-division-multiplexed signal is dealt with a single optical filter, a similar effect can be obtained, also in the case where another system, another method, or a plurality of optical filters are used. That is, for the modulator scheme, the amplitude shift keying (ASK), the phase shift keying (PSK), or the differential phase shift keying (DPSK) may be used as well. For the modulation method, an external modulation may be used. For the demodulation scheme, the homodyne detection as well as the dual-filter envelope detection, the delay demodulation, the differential by coherent demodulation and the synchronized demodulation may be used. Further different signals may be inputted in separate optical filters before the optical frequency division multiplexing and the outputs of the separate optical filters may be optical-frequency division-multiplexed to obtain the output of the optical frequency division multiplexing transmitter. Machzender interferometer and optical transversal filter can also be used as optical filters.

Figure 4:
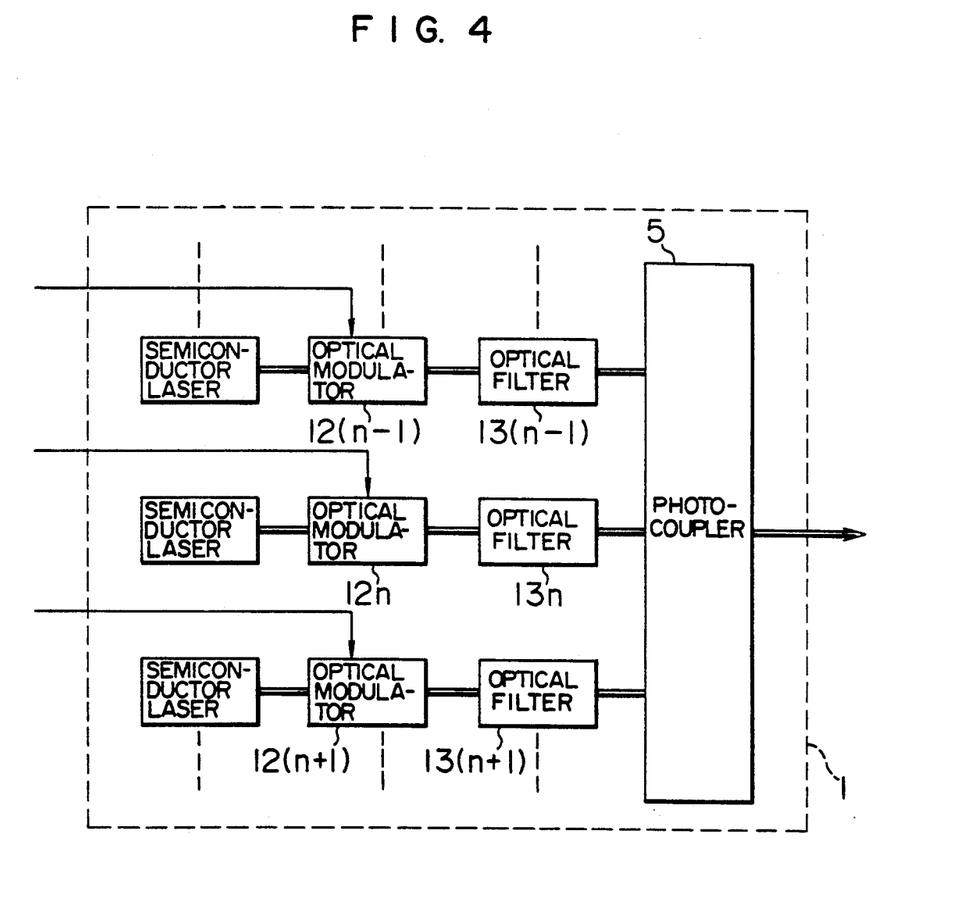
FIG. 4 is a scheme showing a second embodiment of the optical frequency division multiplexing transmitter according to the present invention.

As an example, a second embodiment of the optical frequency division multiplexing transmitter is indicated in FIG. 4. Semiconductor lasers serving as light sources are driven by DC current so that the optical intensity and the optical frequency of the outputs thereof are stable. Numeral 12 is an external light modulator, in which an electric signal is inputted and which modulates light coming from a light source. External light modulators for ASK, FSK and PSK using electro optic crystals, etc. are sold in the market. Numeral 13 is an optical filter, which makes the smallest part of the spectrum necessary for demodulating a signal outputted by the external optical modulator 12 pass through. For example, since there is only one signal, which passes through an optical filter 13(n−1), it is sufficient of the central frequency of one passband of the optical filter 13(n−1) is almost in accordance with the central frequency of the signal. Although the bandwidth $B_f$ of the passband is identical to the case described in the first embodiment, it is desirable that the frequency spacing $D_f$ between the passband, through which the signal passes, and the passband adjacent thereto is as large as possible. Numeral 5 is an optical coupler, which multiplexes the output from the optical filters 13 to output them The output of the optical frequency division multiplexing transmitter 1 in the present embodiment is identical to the output of the optical frequency division multiplexing transmitter in the first embodiment, if the modulation scheme for signals is same.

Figure 5A:
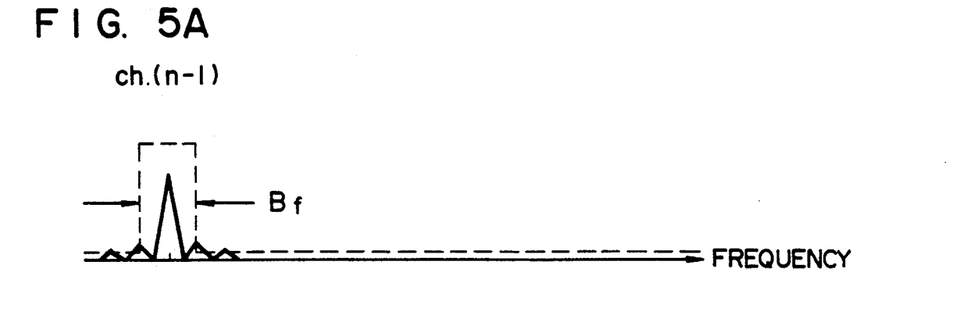
FIGS. 5A to 5D are schemes showing the spectrum of the signal and the transmission characteristics of an optical filter in the second embodiment.
Figure 5B:
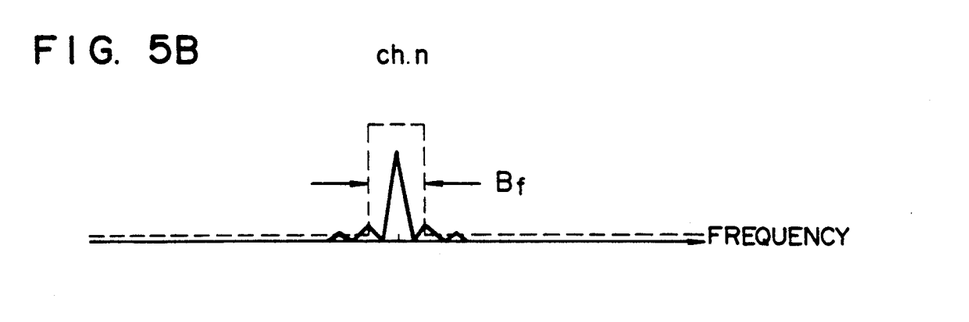
Figure 5C:
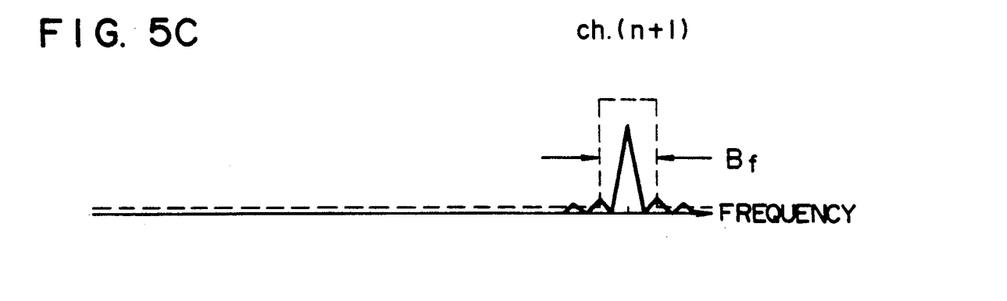
Figure 5D:
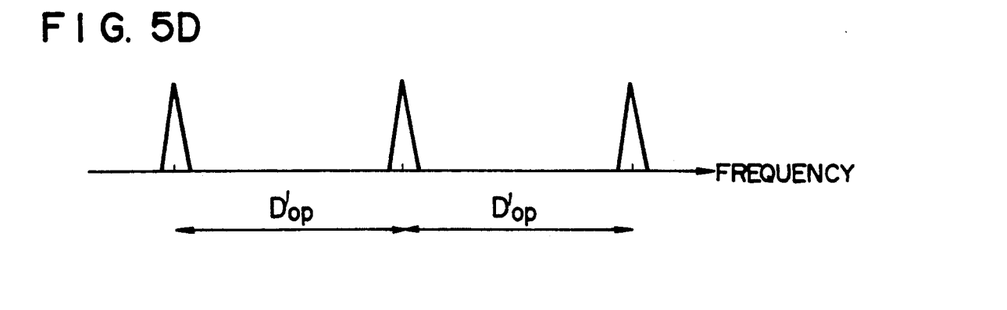

FIGS. 5A to 5D show spectrums of the signals in the case where the ASK scheme is used for the modulation scheme. FIG. 5A indicates the spectrum of the ASK signal obtained by modulating light from the semiconductor laser serving as the light source by means of the external optical modulator 12(n−1) and the transmission characteristics of the optical filter 13(n−1). Since the spectrum of the signal trails widely side lobes on the frequency axis, as indicated in the figure, a part of the side lobes of the adjacent channel is superposed on the received channel on the optical frequency axis or the IF frequency axis, which causes crosstalk. Consequently the channel spacing can be reduced by eliminating the side lobes by means of the optical filters having the transmission characteristics as indicated in the figure. The side lobes are eliminated in the same way also for the channel n (FIG. 5B) and the channel (n+1) (FIG. 5C) and it is possible to obtain the spectrum as indicated in FIG. 5D. The narrowing of the channel spacing by the elimination of the side lobes can be applied not only to the case of the ASK modulation but also to the case of the narrow band FSK, DPSK or PSK modulation. Further the dual-filter envelope detection, the delay demodulation, the differentially coherent phase demodulation, the synchronized demodulation and the homodyne detection may be used for the demodulation scheme in the optical receiver.

According to the present embodiment, apart from the FSK, the ASK, the PSK and the DPSK may be used for the modulation scheme and the external modulation may be used for the modulation method. Further an effect is obtained that the restriction on the frequency spacing between the passband of the optical filter and the passband adjacent thereto can be alleviated.

Figure 6:
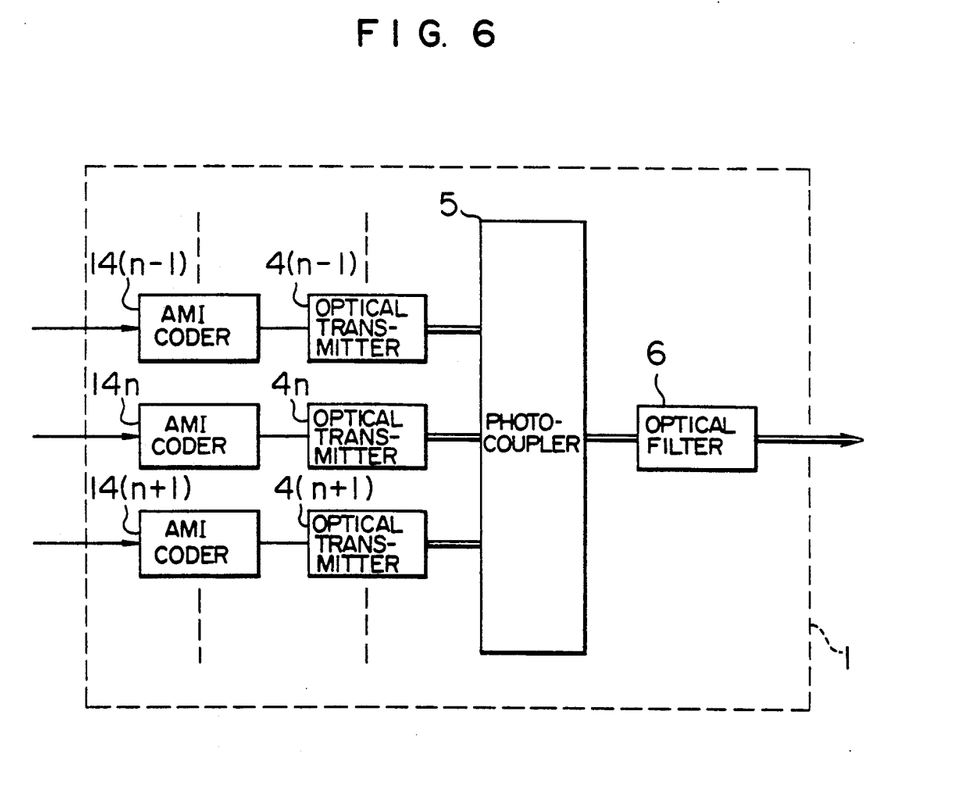
FIG. 6 is a scheme showing a third embodiment of the optical frequency division multiplexing transmitter according to the present invention.

FIG. 6 shows a third embodiment of the optical frequency division multiplexing transmitter. In the present embodiment the optical transmitters are modulated directly by using signals coded by the alternate mark inversion (AMI) to obtain FSK or DPSK signals. The AMI code is useful for suppressing deterioration of the transmission characteristics due to the non uniform frequency modulation (FM) response of the semiconductor laser servings as the transmitter light source and the detail thereof is discussed in a literature "The Transactions of the IEICE, Vol. E71, No. 11, November 1988, pp. 1086–1088". In FIG. 6, an electric signal is at first AMI-coded in an AMI coder 14 and thereafter modulates directly an optical transmitter 4. Output signals from different optical transmitters are optical frequency division-multiplexed by an optical coupler 5 and inputted in an optical filter 6.

Figure 7:
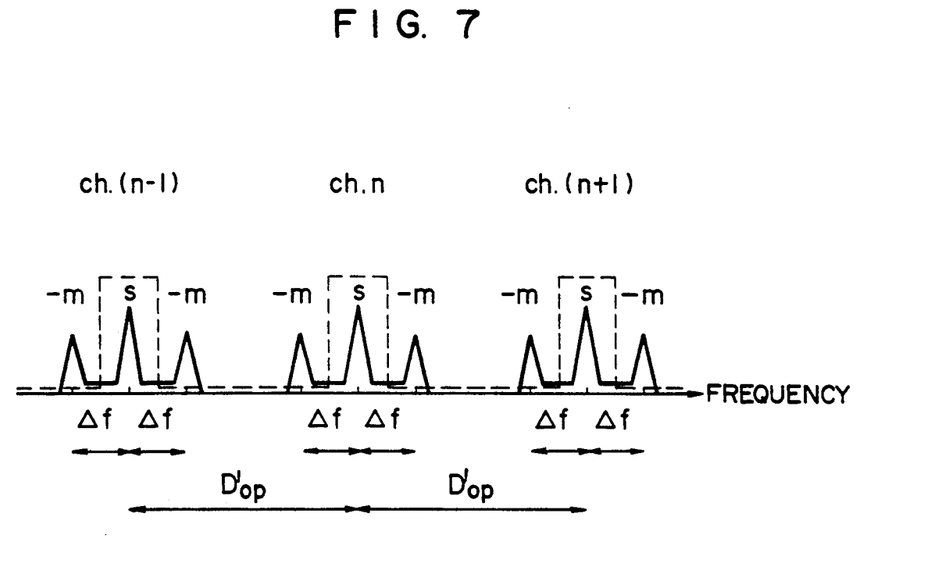
FIG. 7 is a scheme showing the spectrum of the signal and the transmission characteristics of an optical filter in the third embodiment.

FIG. 7 indicates an example of the spectrum of the optical-frequency-division-multiplexed signal and the transmission characteristics of the optical filter, in the case where the FSK modulation scheme is used. Since the polarity of the mark component varies alternately ('−m' and '+m'), the spectrum of the signal, in the case where the AMI code is used, is extended more widely by about the frequency deviation Δf than in the case where the AMI code is not used. As this result, the channel spacing should be set wider, corresponding thereto. However, when only the space component is extracted by using the optical filter and the mark component is eliminated as in the present embodiment, the channel spacing $D'_{op}$ can be set almost identical to that used, in the case where the AMI code is not used (FIG. (2)).

From the above description, according to the present embodiment, an effect is obtained that, even in the case where the AMI code is used, the channel spacing can be reduced almost in a same degree as in the case where the AMI code is not used.

Figure 8:
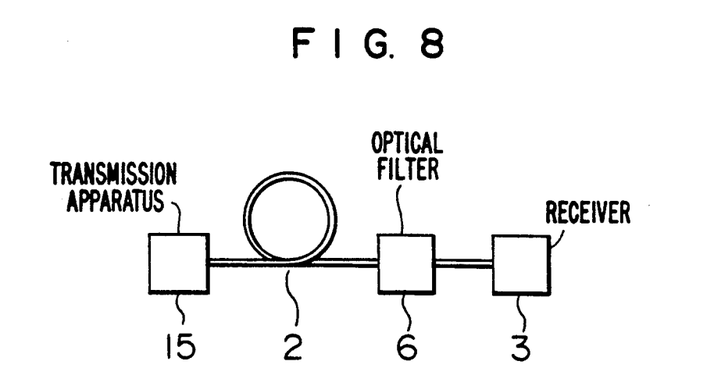
FIG. 8 is a scheme showing a second embodiment of the optical frequency division multiplexing transmission apparatus.

FIG. 8 shows a second embodiment of the optical frequency division multiplexing transmission apparatus according to the present invention, in which 15 is a prior art optical frequency division multiplexing transmission apparatus including no optical filters and 2, 3 and 6 represents the same items as those described in the other embodiments. In the present embodiment an optical filter 6 is connected directly before a heterodyne or homodyne optical receiver 3. In general, if the optical filter is connected between the optical frequency division multiplexing transmission apparatus 15 and the optical receiver 3, an effect simular to those in the other embodiments can be obtained, i.e. it is possible to reduce the channel spacing with respect to that used by the prior art techniques.

Figure 9:
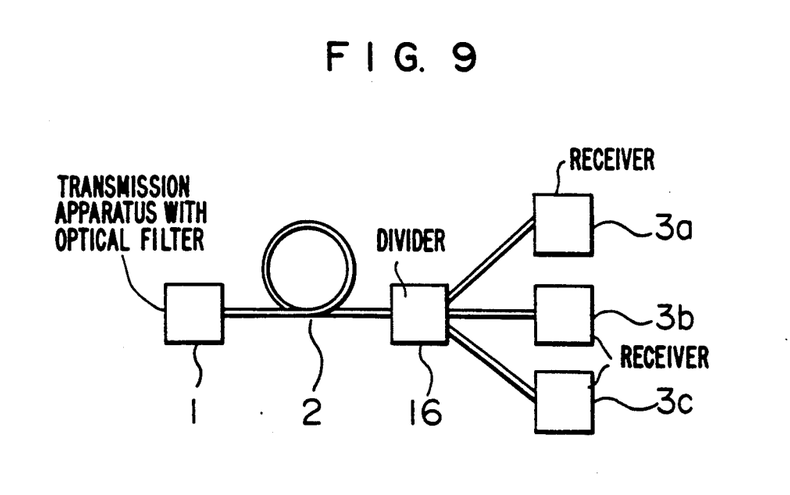
FIG. 9 is a scheme showing a third embodiment of the optical frequency division multiplexing transmission apparatus according to the present invention.

FIG. 9 shows a third embodiment of the optical frequency division multiplexing transmission apparatus according to the present invention. In the present embodiment there are disposed a plurality of optical receivers (3a, 3b and 3c). In the case where 16 represents an optical divider, heterodyne and homodyne optical detectors can be used for the optical receivers. On the other hand, in the case where 16 is an optical demultiplexer, optical direct detectors can be also used for the optical receivers other than heterodyne and homodyne optical detectors. According to the present embodiment an effect is obtained that a plurality of signals can be received simultaneously.

Summarizing the above description, in the case where the modulation scheme is ASK or wide band FSK (single filter and envelope detection), the bandwidth $B_f$ of the passband required to the optical filter is about more than twice as great as bit rate. On the other hand, in the case where the modulation scheme is wide band FSK (dual-filter envelope detection), narrow band FSK, DPSK or PSK, it is about more than (twice as great as bit rate + frequency deviation $\Delta f$). When the AMI code is used, in the case where the demodulation scheme is single filter and envelope detection or synchronized demodulation, by which only the space component is extracted and demodulated, a bandwidth about more than twice as great as bit rate is sufficient. In the case where the envelope detection and the synchronized detection, by which the space and both + and − marks are demodulated or the delay demodulation are used, a bandwidth about more than (twice as great as bit rate + twice as great as frequency deviation $\Delta f$) is required. In addition, in the case where the phase noise (spectrum linewidth = $\Delta \nu$) of the optical transmitter is so great that it is not negligible, the bandwidth $B_f$ of the passband may be set so as to be wider further by about $\Delta \nu$. Further either one of the optical detection methods (heterodyne and homodyne) may be used. Even in the Case where the bandwidth $B_f$ is deviated from the value described above, an effect can be obtained that the channel spacing can be smaller than that used by the prior art techniques, if an optical filter is connected in the system.

Furthermore, although the coherent optical communication techniques (FSK modulation, heterodyne detection, etc.) are used in all the embodiment described above, the similar effect, i.e. the effect that the channel spacing can be reduced with respect to that used in the case where no optical filters are used, is obtained also in the case where the optical direct detection method is used for the demodulation scheme.

Still further the optical filter according to the present invention may be used in common for other objects. For example, the optical filter described above can be used in common for stabilizing the optical frequency spacing of a plurality of transmitter light sources. In this case, it is sufficient that the optical-frequency-division-multiplexed signal outputted by the optical filter is divided into two, one of which is inputted in the optical filter for the transmission, the other of them being inputted in a frequency spacing stabilizing device.

Figure 10:
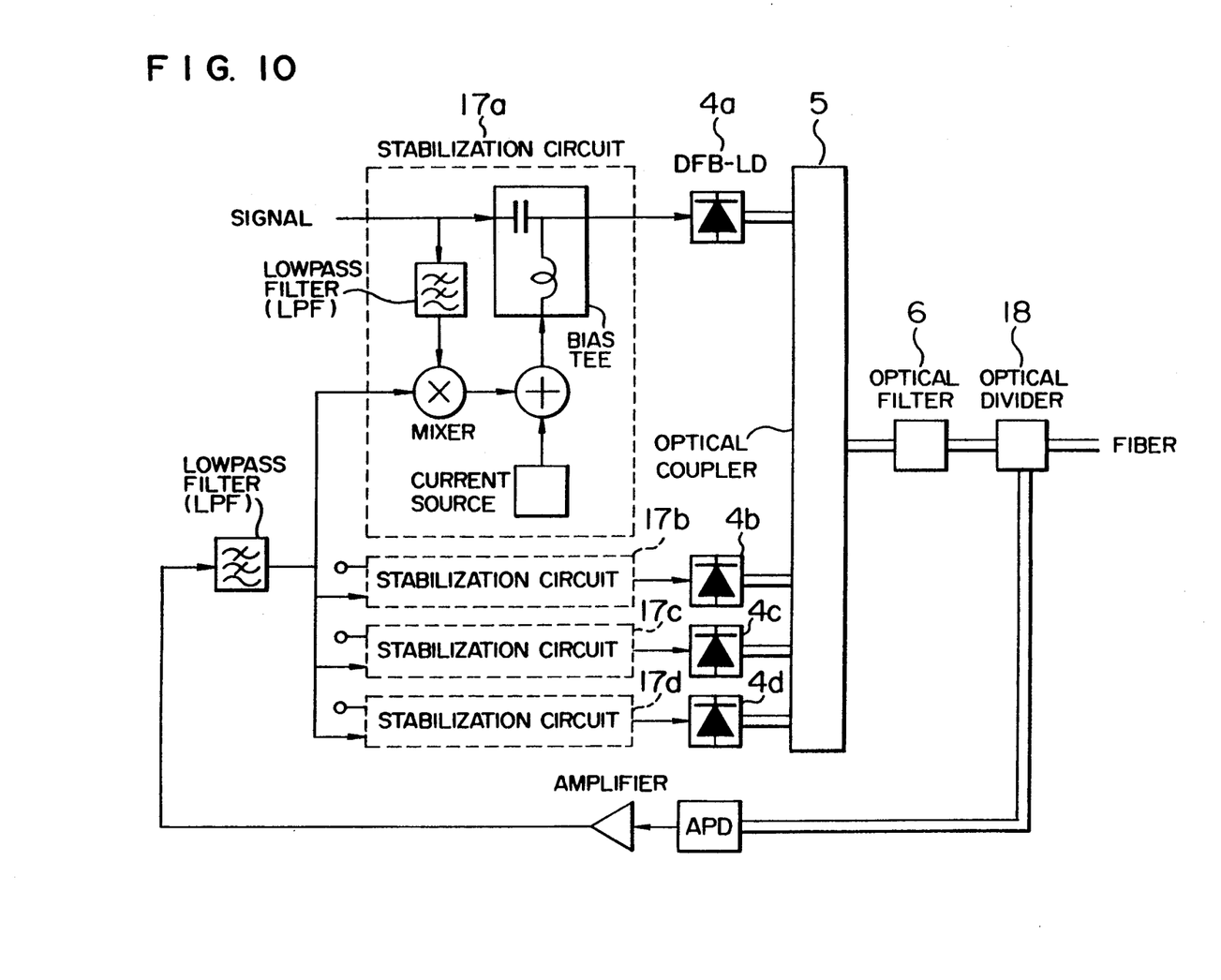
FIG. 10 is a scheme showing an example of the construction of a frequency stabilizing device.

FIG. 10 shows an example of the construction of the frequency stabilizing device, which is an example, in the case where N=4. The signal passes through a frequency stabilization circuit 17 and modulates a DFB-LD, which is an optical transmitter 4. A 4-channel signal multiplexed by the optical coupler 5 is divided into 2 by the optical divider 18 after having been inputted in the optical filter 6. One of the signals obtained by the division is sent to the optical fiber and the other is used for stabilizing the frequency spacing. In the optical filter variations in the frequency of each of the optical signals is converted into variations in the optical intensity of each of the optical signals. An APD (avalanche photodiode) converts simultaneously the different signals into electric signals. At this time, variations in the frequency of each of the optical signals are converted into variations in the voltage of each of the electric signals. The signals outputted by the APD are divided into 4, each of which is inputted in each of the stabilization circuits after having been amplified and low-passfiltered. In each of the stabilization circuit information (error signal) of frequency variations of the light source connected with each of the circuits is extracted by multiplying the divided signal by the initial signal (the multiplication being effected by means of a mixer). The variations in the frequency can be cancelled by adjusting the current so that the error signal is brought close to zero. An example of the optical frequency spacing stabilization using an optical filter is discussed in detail (Electronics Letters, Vol. 25, No. 9, pp. 574–576, 1989).

As described above, according to the present invention, the channel spacing on the optical frequency axis can be reduced with respect to that used by the prior art techniques. That is, since an optical frequency division multiplexing transmitter capable of opticalfrequency-division-multiplexing signals with a channel spacing smaller than that used by the prior art techniques and an optical frequency division multiplexing transmission apparatus capable of transmitting the opticalfrequency-division-multiplexed signals thus obtained can be realized, an effect is obtained that an optical communication system having a capacity larger than that obtained by the prior art techniques can be realized.

We claim:

1. An optical frequency division multiplexing apparatus for a heterodyne or homodyne optical receiver, comprising:

a plurality of optical transmitters for outputting FSK (Frequency Shift Keying) optical signals having different optical frequencies with a transmitting-channel spacing, each of the FSK optical signals comprising a mark component and a space component;

an optical combiner for multiplexing the FSK optical signals and providing a multiplexed FSK optical signal comprising mark components and space components; and an optical filter coupled to the optical combiner for outputting either the mark components or the space components of the multiplexed FSK optical signal;

wherein the transmitting-channel spacing is a sum of a received-channel spacing in the heterodyne or homodyne optical receiver and two times a central frequency of a received channel in the heterodyne or homodyne optical receiver.

2. An optical frequency division multiplexing transmitter for a heterodyne or homodyne optical receiver, comprising:

a plurality of semiconductor lasers;

a plurality of optical modulators, respective ones of the optical modulators being coupled to respective ones of the semiconductor lasers for outputting ASK (Amplitude Shift Keying) optical signals having different optical frequencies with a transmitting-channel spacing;

a plurality of optical filters, respective ones of the optical filters being coupled to respective ones of the optical modulators for outputting the ASK optical signals by eliminating side lobes therein; and an optical combiner for multiplexing the ASK optical signals from the optical filters;

wherein the transmitting-channel spacing is a sum of a received-channel spacing in the heterodyne or homodyne optical receiver and two times a central frequency of a received channel in the heterodyne or homodyne optical receiver.

3. An optical frequency division multiplexing transmitter for a heterodyne or homodyne optical receiver, comprising:

a plurality of AMI (Alternate Mark Inversion) coders outputting AMI coded electric signals, a plurality of optical transmitters, respective ones of the optical transmitters being coupled to respective ones of the AMI coders for outputting FSK optical signals having different optical frequencies with a transmitting-channel spacing, each of the FSK optical signals comprising two mark components and a space component;

an optical combiner for multiplexing the FSK optical signals and providing a multiplexed FSK optical signal comprising mark components and space components; and an optical filter coupled to the optical combiner for outputting the space components of the multiplexed FSK optical signal;

wherein the transmitting-channel spacing is a sum of a received-channel spacing in the heterodyne or homodyne optical receiver and two times a central frequency of a received channel in the heterodyne or homodyne optical receiver.

4. An optical frequency division multiplexing transmission system, comprising:

a plurality of optical transmitters for outputting FSK (Frequency Shift Keying) optical signals having different optical frequencies with a transmitting-channel spacing, each of the FSK optical signals comprising a mark component and a space component;

an optical combiner for multiplexing the FSK optical signals and providing a multiplexed FSK optical signal comprising mark components and space components;

an optical filter coupled to the optical combiner for outputting either the mark components or the space components of the multiplexed FSK optical signal;

an optical fiber transmitting said either the mark components or the space components of the multiplexed FSK optical signal from the optical filter; and a heterodyne or homodyne optical receiver coupled to the optical fiber for demodulating a received channel signal;

wherein the transmitting-channel spacing is a sum of a received-channel spacing in the heterodyne or homodyne optical receiver and two times a central frequency of a received channel in the heterodyne or homodyne optical receiver.

5. An optical frequency division multiplexing transmission system comprising:

an optical frequency division multiplexing transmitter comprising a plurality of optical transmitters for outputting FSK optical signals having different optical frequencies with a transmitting-channel spacing, each of the FSK optical signals comprising a mark component and a space component, an optical combiner for multiplexing the FSK optical signals and providing a multiplexed FSK optical signal comprising mark components and space components;

an optical fiber coupled to the optical frequency division multiplexing transmitter for transmitting the multiplexed FSK optical signal;

an optical filter coupled to the optical fiber for outputting either the mark components or the space components of the multiplexed FSK optical signal; and a heterodyne or homodyne optical receiver coupled to the optical filter for demodulating a received channel signal;

wherein the transmitting-channel spacing is a sum of a received-channel spacing in the heterodyne or homodyne optical receiver and two times a central frequency of a received channel in the heterodyne or homodyne optical receiver.

6. An optical frequency division multiplexing transmission system, comprising:

a plurality of optical transmitters for outputting FSK (Frequency Shift Keying) optical signals having different optical frequencies with a transmitting-channel spacing, each of the FSK optical signals comprising a mark component and a space component;

an optical combiner for multiplexing the FSK optical signals and providing a multiplexed FSK optical signal comprising mark components and space components;

an optical filter coupled to the optical combiner for outputting either the mark components or the space components of the multiplexed FSK optical signal;

an optical fiber transmitting either the mark components or the space components of the multiplexed FSK optical signal from the optical filter;

an optical divider coupled to the optical fiber for distributing either the mark components or the space components of the multiplexed FSK optical signal; and a plurality of optical receivers coupled to the optical divider, each of the optical receivers demodulating a received channel signal;

wherein the transmitting-channel spacing is a sum of a received-channel spacing in the optical receivers and two times a central frequency of a received channel in the optical receivers.

7. An optical frequency division multiplexing transmitter for a heterodyne or homodyne optical receiver, comprising:

a plurality of semiconductor lasers for outputting FSK optical signals having different optical frequencies with a transmitting-channel spacing, each of the FSK optical signals comprising a mark component and a space component;

an optical combiner for multiplexing the FSK optical signals from the semiconductor lasers and providing a multiplexed FSK optical signal comprising mark components and space components;

an optical filter coupled to the optical combiner for outputting either the mark components or the space components of the multiplexed FSK optical signal; and a plurality of stabilization circuits for controlling input signals of the semiconductor lasers in accordance with the output of the optical filter to enable stabilization of the FSK optical signals from the semiconductor lasers, wherein the transmitting-channel spacing is a sum of a received-channel spacing in the heterodyne or homodyne optical receiver and two times a central frequency of a received channel in the heterodyne or homodyne optical receiver.

* * * * *